United States Patent [19]

Kishitaka

[11] Patent Number: 5,355,495
[45] Date of Patent: Oct. 11, 1994

[54] CONTROL SYSTEM FOR A RECORDING AND/OR REPRODUCING APPARATUS

[75] Inventor: Yuriko Kishitaka, Chiba, Japan

[73] Assignee: Sony Corporation, Tokyo, Japan

[21] Appl. No.: 827,350

[22] Filed: Jan. 29, 1992

[30] Foreign Application Priority Data

Jan. 31, 1991 [JP] Japan .................................. 3-011329

[51] Int. Cl.[5] .......................................... G05D 13/00
[52] U.S. Cl. ..................... 395/700; 395/650; 364/261.3; 364/261.5; 364/222; 364/221; 364/DIG. 1
[58] Field of Search .................. 364/227; 395/700; 358/312; 360/10.1

[56] References Cited

U.S. PATENT DOCUMENTS

| | | | |
|---|---|---|---|
| 4,165,159 | 9/1979 | Landau et al. | 353/15 |
| 4,210,785 | 7/1980 | Huber et al. | 179/100.1 PS |
| 4,302,785 | 11/1981 | Mussatt | 360/72.1 |
| 4,745,495 | 5/1988 | Hashimoto | 360/13 |

Primary Examiner—Gareth D. Shaw
Assistant Examiner—Jonathan Backenstose
Attorney, Agent, or Firm—Lewis H. Eslinger; Jay H. Maioli

[57] ABSTRACT

A method of performing state transition control in an electronic apparatus in which it is first determined whether a functional transition request has occurred. A main routine is performed if no transition request has occurred and a state transition processing is performed if a transition request has occurred. By calling the main routine as a subroutine during the state transition processing, interrupt processing and separated stack processing are avoided.

1 Claim, 9 Drawing Sheets

CONTROL SYSTEM FOR A RECORDING AND/OR REPRODUCING APPARATUS

BACKGROUND OF THE INVENTION

1. Field of the Invention

The present invention generally relates to state transition control systems and, more particularly, is directed to a transition control system for use with a recording and/or reproducing apparatus such as a video tape recorder in which state transition control is carried out sequentially and with a lot of time.

2. Description of the Prior Art

In the prior art, control in which state transitions are executed sequentially and with a lot of time is typically executed by a video tape recorder (VTR) shown, for example, in FIG. 1 as follows.

Initially, an arrangement of this VTR will be described. In this example, as shown in FIG. 1, a microcomputer 2 having programs for operation input processing, state decision processing and state transition control processing is connected with a keyboard 4, a remote controller input unit 6, an editor input unit 8, a mechanism unit 10, a servo circuit 12 and a video-audio signal circuit 14.

As the control done by the microcomputer 2 thus arranged, i.e., control in which state transition is executed sequentially and with a lot of time, ordinary processing is carried out. The ordinary processing is composed of a routine control for a bus line and detection of state transition factor, The routine bus line control is for communication processing among respective ICs (integrated circuits) of an external bus line, an interface, a character generator, a video signal processing unit or the like, and a LCD (liquid crystal display) drive microcomputer and so on. The detection of a state transition factor is authentication of any of the following: input information from the keyboard 4, the remote controller input unit 6, the editor input unit 8, detection of a tape top or tape end of a video tape from the mechanism unit 10 or the servo circuit 12.

The above-mentioned control done by the microcomputer 2 further includes a processing during state transition and, in this processing during state transition, the afore-said ordinary processing is executed and the switching of the respective circuits and the state transition processing of the mechanism unit 10 are executed sequentially. When the VTR is set in the playback mode from the stop mode (STOP), for example, a rotary head drum having magnetic heads mounted thereon is rotated and then the corresponding part of the mechanism unit 10 is changed from the stop mode to the video tape transport mode. Further, a capstan is rotated, the rotary head drum and the capstan are servo-controlled and the video-audio signal processing unit 14 is actuated in playback mode, thereby video and audio signals being reproduced. In this case, the VTR is set in the state transition standby mode of several seconds at every processing. This ordinary processing includes a loop processing of steps shown in FIG. 2 as a main routine.

The processing during state transition is comprised of state transition interrupt processings which utilize an interrupt function such as a timer interrupt or the like as shown in FIGS. 3A, 3B, a pointer processing of the state transition which is inserted into the main routine by utilizing a pointer as shown in FIG. 4, processings utilizing separated stacks wherein the processing utilizing a stack for the state transition provided separately is executed as shown in FIGS. 5A and 5B, and an independent state transition processing wherein the ordinary processing during the state transition is cut as shown in FIG. 6.

According to the conventional state transition control system, however, in case of executing these processings, a lot of ROMs, RAMs and stacks are required, and further the organizing processings of the interruptions, pointers and stacks are complicated, so that erroneous operations are often caused. Further, when ordinary processing is not executed during state transitions, operations such as selection of functions of the mechanical unit or the like by an operator (that is, a so-called man-machine interaction) can not be performed during the state transition processing, which results in the operability of the device being degraded greatly.

OBJECTS AND SUMMARY OF THE INVENTION

It is an object of the present invention to provide an improved control system in which the aforementioned shortcomings and disadvantages encountered with the prior art can be eliminated.

More specifically, it is an object of the present invention to provide a control system which can execute the complicated state transition processings with a simplified processing procedure.

As an aspect of the present invention, a control system having a loop configuration is comprised of a judging unit for organizing a main routine serving as a subroutine or execution of state transition processing. The main routine executes ordinary processing and a subroutine for executing state transition standby mode organizing processing, and the state transition processing activates processing at every step and sets parameters in a standby mode utilized in the state transition standby mode organizing processing and thereafter executes the subroutine call of the main routine.

According to the control system of the present invention, the main loop serves as a subroutine of the main routine or the state transition processing and the execution of some one of which is organized. In the main routine, the ordinary processing and the subroutine for executing the state transition standby mode organizing processing are executed in the state transition processing the processing is activated at every step and parameters in the standby mode utilized in the state transition standby mode organizing processing are set. Thereafter, the subroutine call of the main routine is executed, so that the present invention has an advantage that the complicated state transition processing can be carried out with a simplified processing procedure.

The preceding and other objects, features, and advantages of the present invention will become apparent from the following detailed description of illustrative embodiments thereof when read in conjunction with the accompanying drawings.

GLOSSARY OF TERMS

As used in the specification and claim, the following definitions apply generally:

Ordinary processing is when the microcomputer exercises routine control over the bus line and when it detects a state transition request to change an operating Actuation state is that condition of the apparatus reflected by the operating parameters, as set by the keyboard, for example;

Operating parameters are instructions in the microcomputer that command a mechanical or electrical unit to perform its designated function;

Standby mode is when an operating parameter is not yet set into the appropriate state to control its respective mechanical or electrical unit; and Control processing is when the microcomputer controls the apparatus to perform the corresponding function selected by the keyboard.

DESCRIPTION OF THE PREFERRED EMBODIMENT

An embodiment of a state transition control system according to the present invention will now be described with reference to FIGS. 7 to 10, in which case, the present invention is applied to the VTR shown in FIG. 1.

Figure 1:
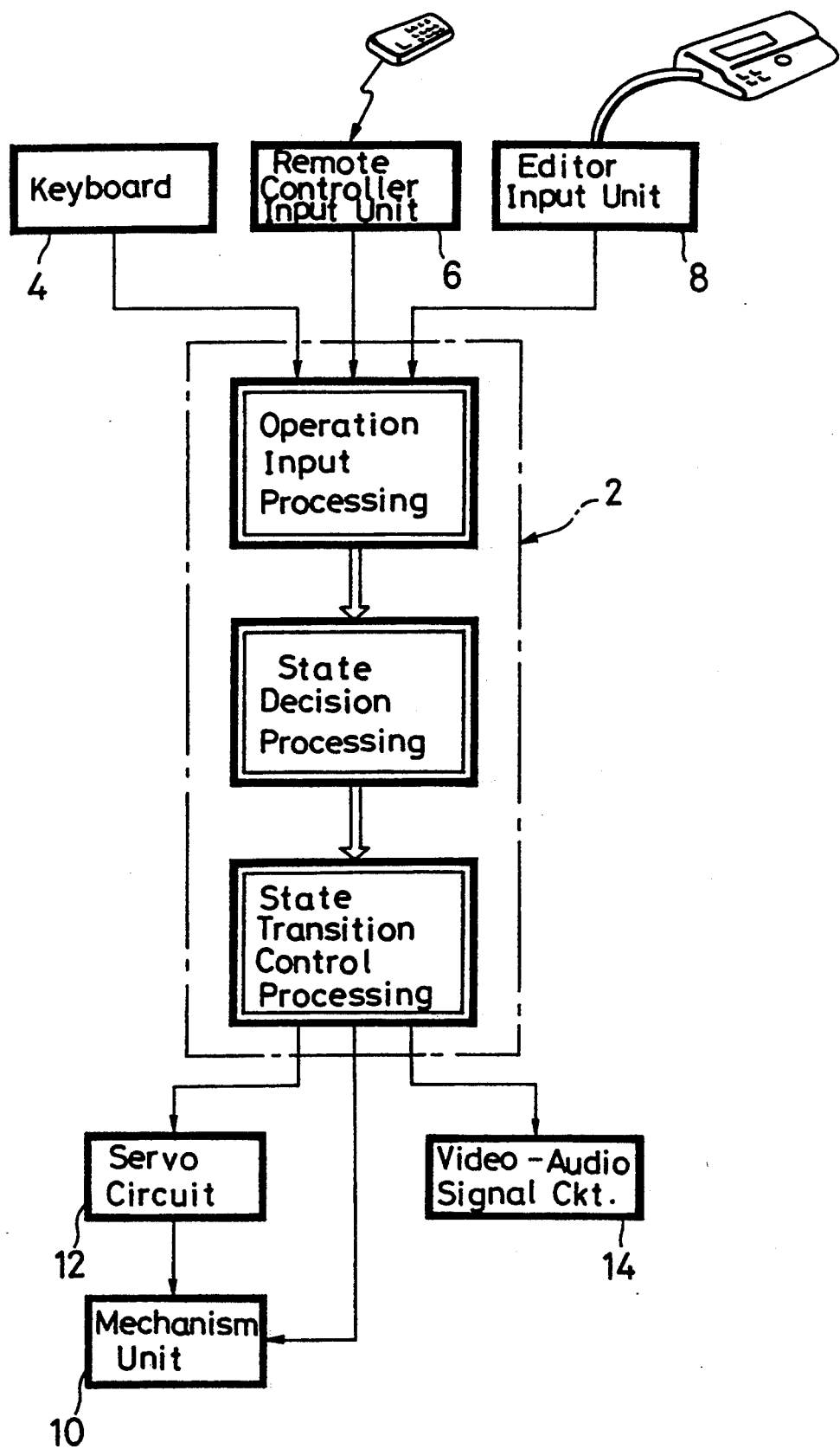
FIG. 1 shows in block form a conventional arrangement of a VTR used to explain the operation thereof.
Figure 2:
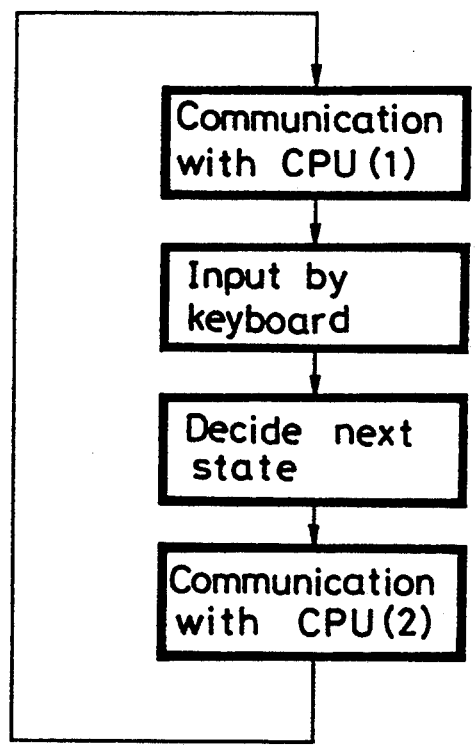
FIG. 2 is a flowchart to which reference will be made in explaining the loop processing of the main routine of the ordinary processing in the conventional state transition control system.
Figures 3A, 3B:
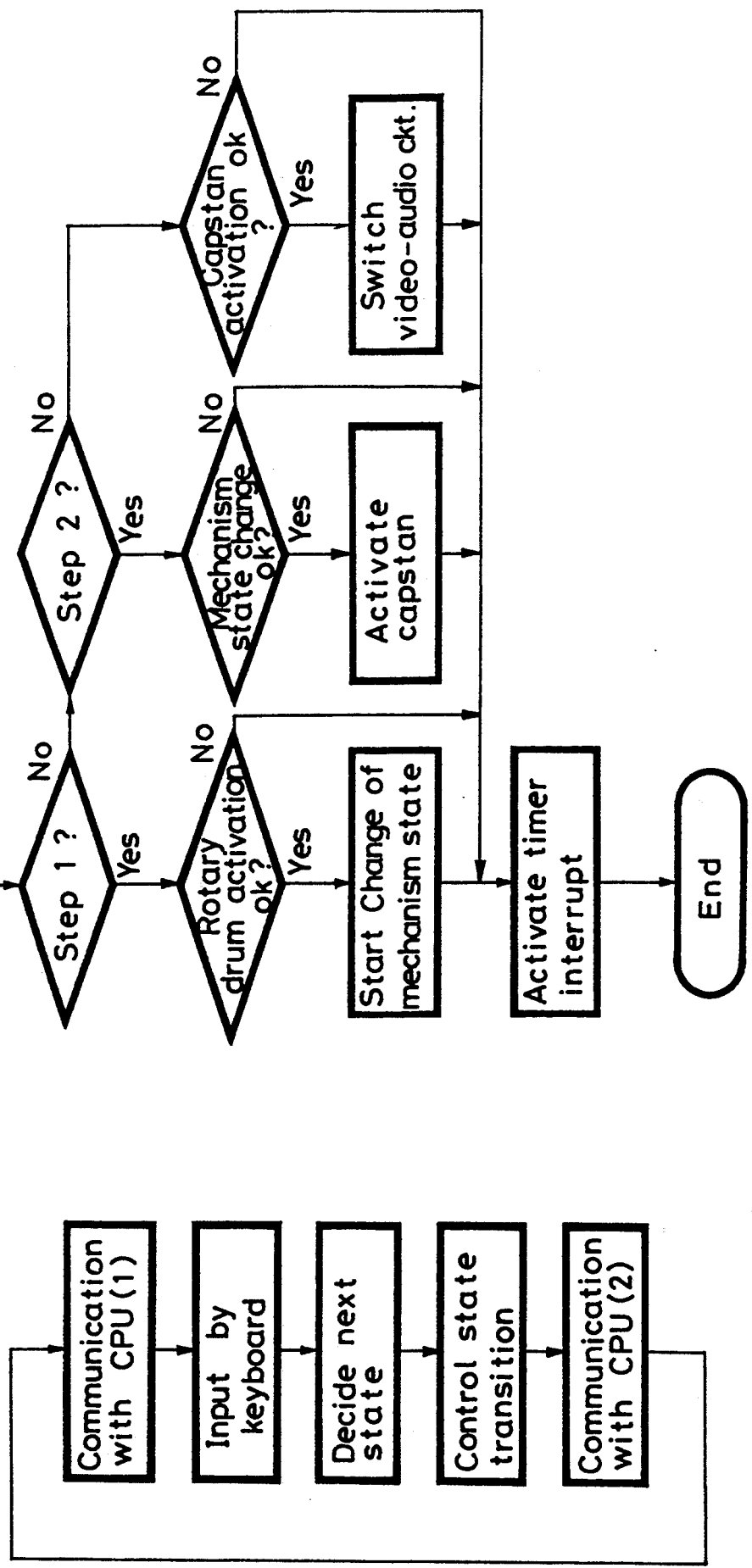
FIGS. 3A and 3B are flowcharts to which reference will be made in explaining the interrupt processings of the state transition during the state transition processing in the conventional state transition control system.
Figure 4:
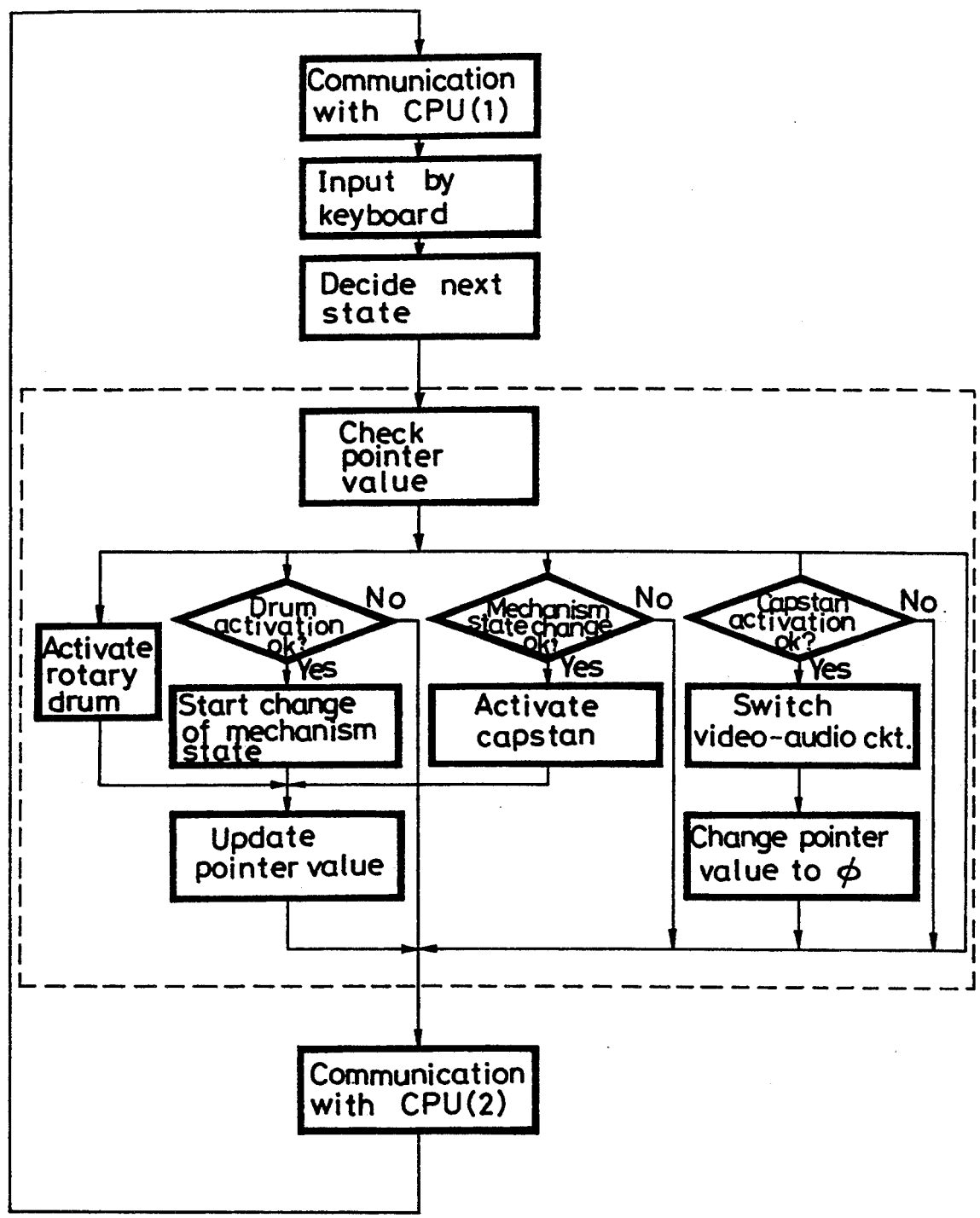
FIG. 4 is a flowchart to which reference will be made in explaining the pointer processing of the state transition during the state transition processing in the conventional state transition control system.
Figure 5A:
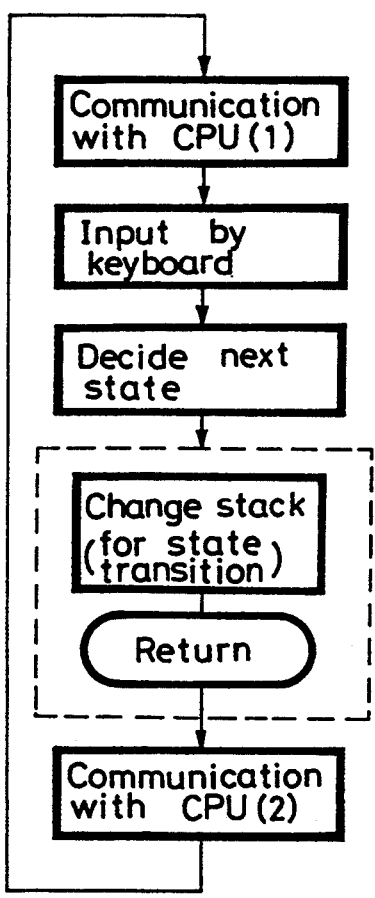
FIGS. 5A and 5B are flowcharts to which reference will be made in explaining the processings utilizing separated stacks during the state transition processing in the conventional state transition control system.
Figure 5B:
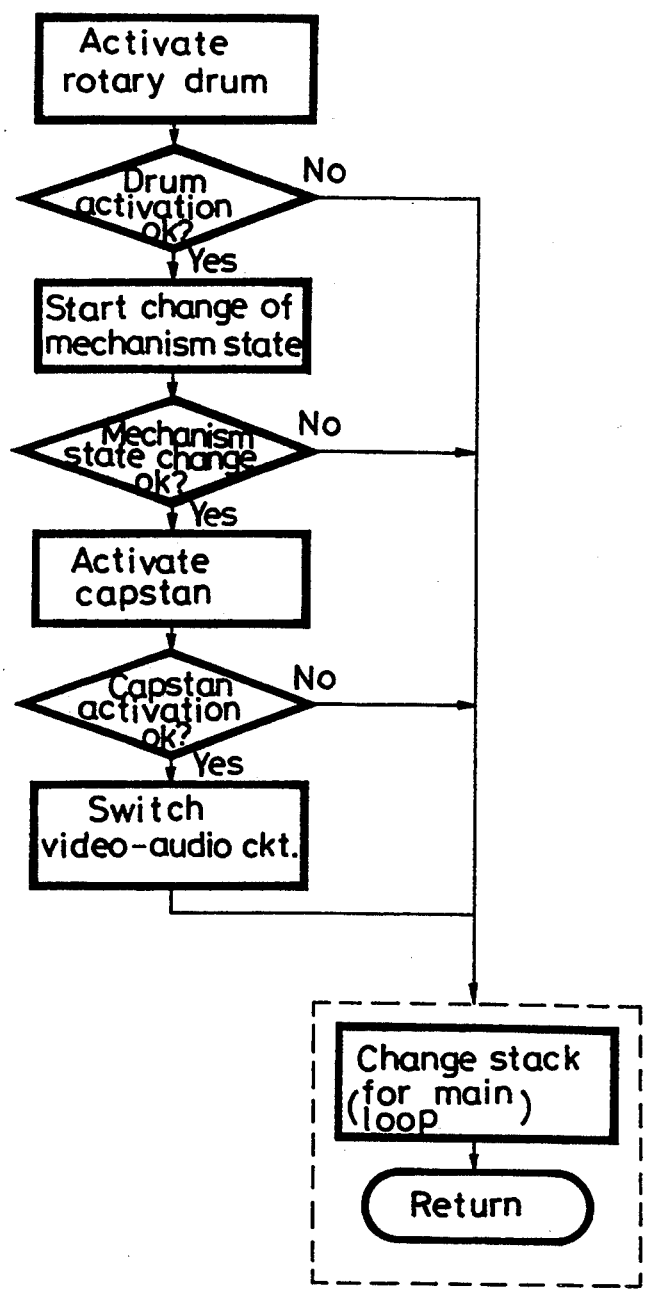
Figure 6:
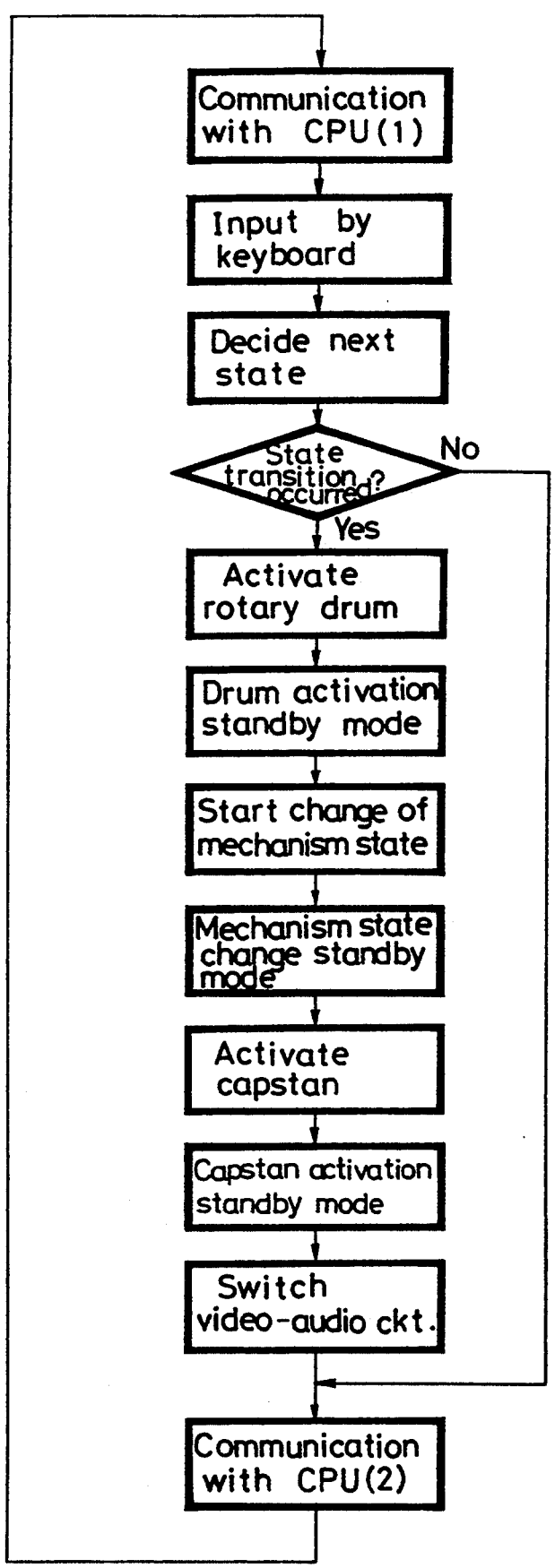
FIG. 6 is a flowchart to which reference will be made in explaining the state transition processing during the state transition processing in the conventional state transition control system.
Figure 7:
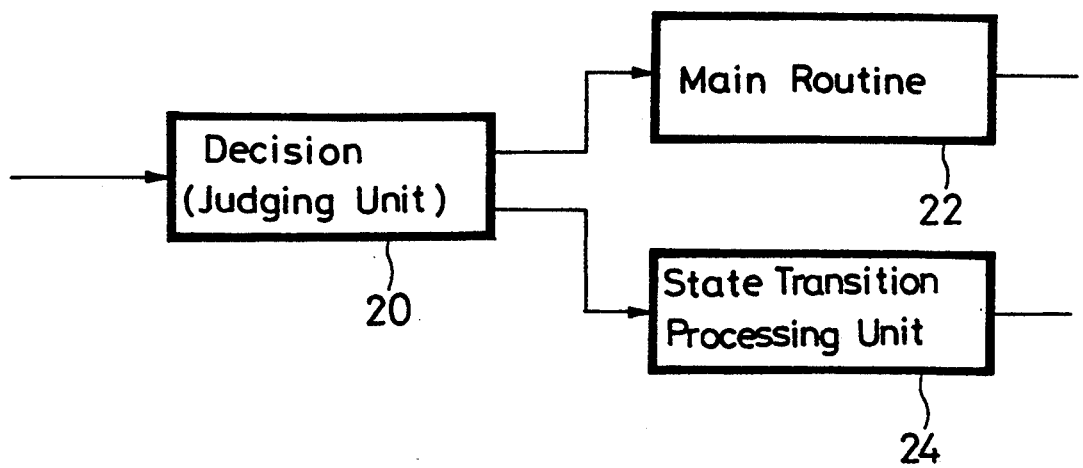
FIG. 7 shows a functional block diagram of the state transition control system according to an embodiment of the present invention.

FIG. 7 shows processing functions of the microcomputer 2 of the VTR shown in FIG. 1. The processing functions are constituted by a main loop having a main routine serving as a subroutine, which has a decision (judging unit) 20 for judging whether or not a state transition has occurred, a main routine 22 for executing the ordinary processing and a state transition standby mode organizing processing if it is judged at the decision 20 that the state transition has not occurred yet, and a state transition processing unit 24 for processing the state transition, if it is judged at the decision step that the state transition has occurred.

Figure 8:
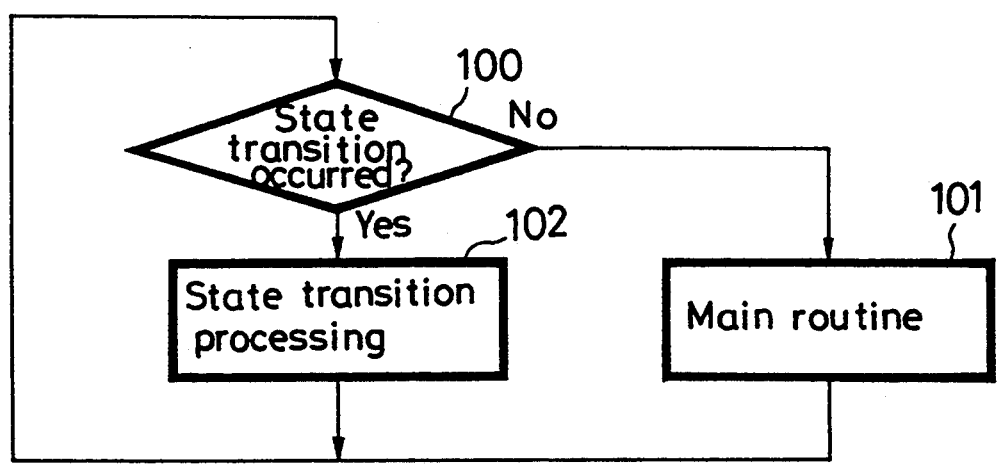
FIG. 8 is a flowchart to which reference will be made in explaining the processing procedures of the functional blocks in FIG. 7.

FIG. 8 shows a flowchart corresponding to the processing procedure of the main loop shown in FIG. 7.

Referring to FIG. 8, it is judged whether or not a state transition has occurred in step 100, which corresponds to the decision (judging unit) 20 in FIG. 7. If the state transition has not occurred as represented by a NO at decision step 100, then the processing of a main routine (corresponding to the main routine 22 in FIG. 7) is executed in step 101, and then the processing returns to decision step 100. The main routine executes a subroutine processing for executing both the ordinary processing and the state transition standby mode organizing processing.

If the state transition has occurred as represented by a YES at decision step 100, then a state transition processing (corresponding to the state transition processing unit 24 of FIG. 7) is executed in step 102, and then the processing returns to decision step 100. The state transition processing activates the processing at every step, sets a parameter in a standby mode which is utilized at the state transition standby mode organizing processing of the main routine, and thereafter executes a subroutine call of the main routine.

Figure 9:
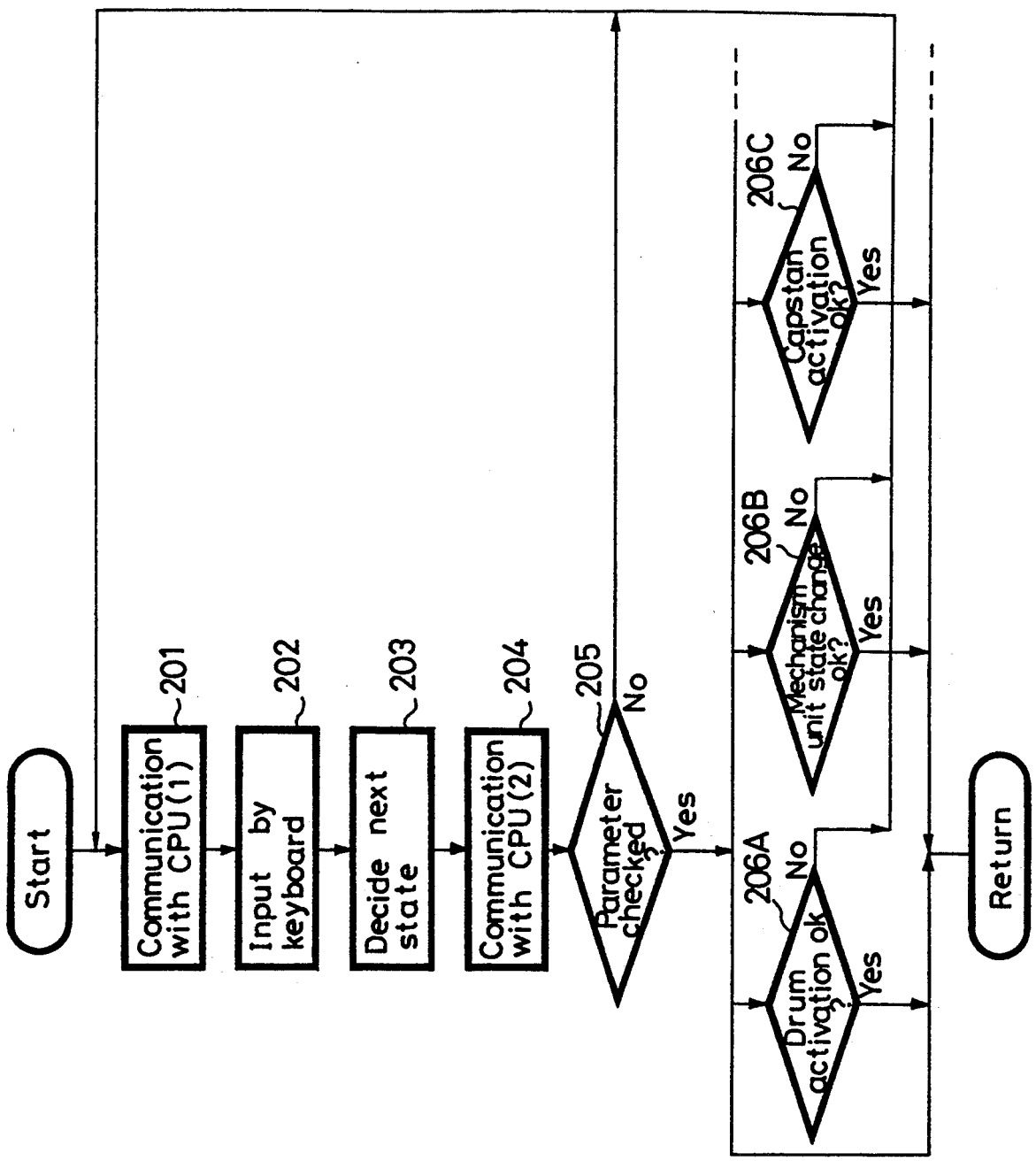
FIG. 9 is a flowchart to which reference will be made in explaining an example of the processing of the main routine in FIG. 8.

FIG. 9 is a flowchart illustrating an example of the processing of the main routine in step 101.

Referring to FIG. 9, following the Start of operation, the communication with a central processing unit (CPU) 1 is carried out in step 201, then the input data by the keyboard is processed in the next step 202. Further, the next state is decided in the next step 203 and then the communication with a CPU 2 is carried out in the next step 204. In the next decision step 205, it is determined whether or not there is a parameter in the state transition standby mode.

If there is no parameter in the standby mode as represented by a NO at decision step 205, then the processing returns to step 201. If there is a parameter in the standby mode as represented by a YES at decision step 205, then the processing proceeds to steps 206A to 206C. In step 206A, it is determined whether or not the rotary dry may be activated, in step 206B, it is determined whether or not the state of the mechanism unit may be changed, and in step 206C, it is determined whether or not the the capstan may be activated. Thus, the main routine executes the ordinary processing and the subroutine for executing the state transition standby mode organizing processing.

Figure 10:
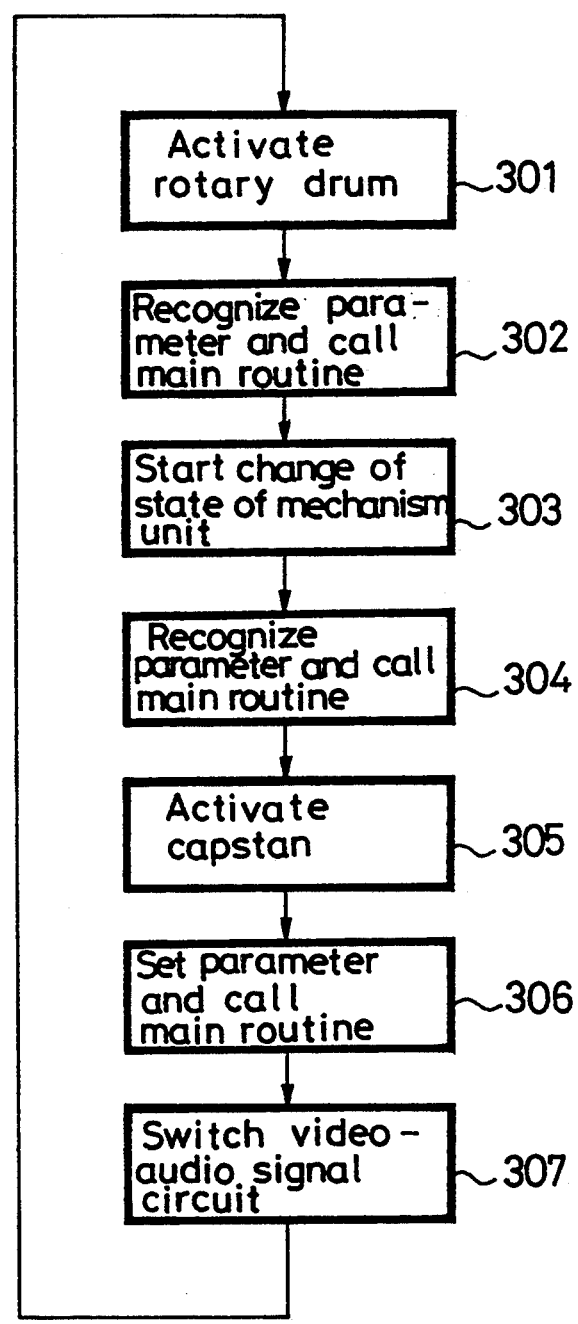
FIG. 10 is a flowchart to which reference will be made in explaining an example of the state transition processing in FIG. 8.

FIG. 10 is a flowchart illustrating an example of the state transition processing of step 102 in FIG. 8.

Referring to FIG. 10, in this example, the rotary drum is activated in step 301, then the parameter is set and the main routine call is executed in the next step 302. Further, the switching operation of the state of the mechanism unit is started in the next step 303, then the parameter is set and the main routine call is executed in the next step 304, and thereafter the capstan is activated in the next step 305. Then, the parameter is set and the main routine call is executed in the next step 306, and subsequently the video-audio signal circuit is switched in step 307.

Thus, in the state transition processing, the processing is activated at every step, and parameters in the standby mode utilized in the state transition standby mode organizing processing are set, and thereafter the subroutine call of the main routine is executed.

According to the embodiment, since the interrupt processing is not utilized and the stack is not separated, the state transition operation can be executed by a microcomputer with a simplified circuit configuration, and therefore error in the processing can be decreased.

Further, the complicated state transition processing of the VTR can be carried out with a simplified processing procedure even by utilizing a single chip microcomputer wherein functions of a ROM, a RAM and a stack etc. are limited and also functions for performing processings such as an interruption and a timer or the like are limited. Also, the multitask processing and a real time processing can be performed without utilizing a complicated operating system for executing these processings. Further, the state transition program in the embodiment can be prepared by preparing a program so as to coincide with the a timing chart of the state transition, so that the processing procedure can be realized easily.

Furthermore, since the operations such as a selection of functions of the mechanical unit or the like, that is, a man-machine interaction can be performed during the state transition processing, the operability of the device to which the invention is applied can be improved.

As described above, according to the state transition control system of the present invention, the main loop is made as a main routine or a subroutine of the state transition processing and the execution of one of which is organized. In the main routine, the ordinary processing and the subroutine for executing the state transition standby mode organizing processing are executed, and further in the state transition processing, the processing is activated at every step and parameters in the standby mode utilized in the state transition standby mode organizing processing are set, and thereafter the subroutine call of the main routine is executed, so that the present invention has an advantage that the complicated state transition processing can be carried out with a simplified processing procedure.

Having described the preferred embodiment of the invention with reference to the accompanying drawings, it is to be understood that the invention is not limited to the precise embodiment and that various changes and modifications thereof could be effected by one skilled in the art without departing from the spirit or scope of the novel concepts of the invention as defined in the appended claim.

What is claimed is:

1. A method of performing state transition control of a plurality of state transitions forming in a specific order a functional transition of an electronic apparatus having a central processing unit, a keyboard, and a plurality of operating parameters describing the state of the apparatus, comprising the steps of:

executing control processing including input/output functions with a central processing unit of the apparatus;

detecting whether a function transition request has occurred;

performing a main routine if the transition request has not occurred, in which the main routine includes the steps of a) communicating with the central processing unit of the apparatus;

b) processing data input from the keyboard of the apparatus;

c) determining whether an operating parameter of the apparatus is in a standby mode;

d) returning to the step of communicating with the central processing unit if no operating parameter is in standby mode;

e) checking an actuation state of operating mechanism of the apparatus if an operating parameter is in the standby mode;

f) returning to the step of communicating with the central processing unit if the actuation state is not present;

g) returning to the step of executing control processing if the actuation state is present; and performing state transition processing if a transition request has occurred, in which the state transition processing includes the steps of:

h) activating a mechanism of the apparatus;

i) recognizing a parameter of the state transition request and call the main routine corresponding thereto;

j) starting switching operation of the state of the activated mechanism; and k) returning to the step of executing control processing upon completion of the switching operation.

* * * * *